(12) United States Patent
Bahniuk

(10) Patent No.: US 6,644,597 B1
(45) Date of Patent: Nov. 11, 2003

(54) CANOPY QUICK RELEASE DEVICE FOR PARACHUTES

(76) Inventor: Douglas E. Bahniuk, 1925 Lee Rd., Cleveland Heights, OH (US) 44118

( * ) Notice: Subject to any disclaimer, the term of this patent is extended or adjusted under 35 U.S.C. 154(b) by 0 days.

(21) Appl. No.: 10/058,883

(22) Filed: Jan. 28, 2002

Related U.S. Application Data

(60) Provisional application No. 60/264,527, filed on Jan. 26, 2001.

(51) Int. Cl.[7] .......................... B64D 17/62; B64D 17/64; B64D 17/30; B64D 17/38
(52) U.S. Cl. .............................. 244/151 B; 244/151 A; 244/151 R; 244/149; 244/142
(58) Field of Search ................ 244/138 R, 142, 244/147, 151 R, 151 A, 151 B, 149, 145; 24/309, 602, 573.11, 645; 280/801.1, 808

(56) References Cited

U.S. PATENT DOCUMENTS

| | | | | |
|---|---|---|---|---|
| 2,447,921 A | * | 8/1948 | Thomas ................ | 244/151 B |
| 2,473,554 A | * | 6/1949 | Warner et al. ................ | 24/645 |
| 2,834,083 A | * | 5/1958 | Newell et al. | |
| 3,200,463 A | * | 8/1965 | Craven et al. ................ | 24/645 |
| 4,030,689 A | * | 6/1977 | Rodriguez ............. | 244/151 B |
| 4,307,858 A | * | 12/1981 | Naab et al. ............. | 244/151 B |
| 4,365,776 A | * | 12/1982 | Gaylord et al. ......... | 244/151 A |
| 4,612,687 A | * | 9/1986 | Barwood ..................... | 24/602 |
| 4,684,083 A | * | 8/1987 | Maziarz .................. | 244/151 A |
| 5,887,825 A | * | 3/1999 | Noel ...................... | 244/151 B |
| 6,249,937 B1 | * | 6/2001 | Grenga ................... | 244/151 A |

* cited by examiner

Primary Examiner—Charles T. Jordan
Assistant Examiner—L. Semunegus
(74) Attorney, Agent, or Firm—Pearne & Gordon LLP

(57) ABSTRACT

An apparatus for releasably attaching all stands or risers of a parachute canopy to a parachutist includes two interlocking plates. The plates incorporate a fulcrum, lever, and alignment tabs, which decrease the amount of force required by the parachutist to release the canopy and hold the plates in position.

16 Claims, 5 Drawing Sheets

CANOPY QUICK RELEASE DEVICE FOR PARACHUTES

This application claims the benefit of provisional application Ser. No. 60/264,527, filed Jan. 26, 2001.

BACKGROUND OF THE INVENTION

The present invention relates to a parachute canopy quick release device.

Releasing an entangled main canopy from a person or package in free fall is the first step in the sequence of deploying a reserve canopy. If the entangled main canopy is not released, the possibility that the reserve canopy will become entangled with the main canopy is significant. A main canopy may also have to be released after a person/package has landed, in order to prevent the canopy from inflating, due to wind, and dragging the person along the ground. This scenario is particularly important if high winds exist in the landing area.

When used by a person, a canopy is attached at the person's right and left shoulders.

Several devices exist in an attempt to release the main canopy. Some prior art devices require the user to separately release a mechanism at each shoulder. These devices require a relatively long period to release, a disadvantage when an individual is falling at terminal velocity at low altitudes.

Other devices automatically release the canopy at both shoulders when a person pulls a cord; however these devices are easily assembled in an improper manner and thus prone to failure.

Some prior art devices fail in use and only release one side of the canopy and not the other. The user is thus faced with the unpleasant option of trying to clear the malfunction and running out of altitude, or releasing the reserve into the main, with the increased chance of reserve failure.

Some prior art devices require lubrication and are thus prone to failure if the lubricant is lacking. An overly lubricated device may stain the canopy's risers or the user's clothing.

Other prior art devices require a relatively force to activate. Other prior art devices are large, bulky, relatively heavy, or easily fouled by dirt.

Multiple problems have been identified with one of the most popular systems, commonly called a three-ring release. The rings may deform under high loads. The rings must have metal-to-metal contact: if the large ring is not in contact with the second ring, but is touching the riser webbing, the load transferred to the small ring and loop is drastically increased. Rings also sometimes deform when the parachutist opens the canopy while falling in an unstable attitude, thereby placing a high load on the rings. Rings must be rotated periodically to prevent elongation or deformation.

SUMMARY OF THE INVENTION

The invention is a secure and release mechanism that detachably connects two objects together, and includes a male plate with means to attach said plate to attach to a first object; and a female plate with means to attach to a second object, wherein said female plate has means for accepting said male plate. A pocket located at one end of the female plate accepts a lip located on the corresponding end of the male plate; together these form a lever and fulcrum.

A means for securing said male and female plates to one another is provided. Said means is constructed in such a manner that when a force is applied to the secured plates by the attached objects, a force is also applied to the means for securing by cooperation of the plates and the fulcrum. The means for securing the said male and female plates also provides a means for releasing said male and female plates from one another by operating the means for securing said male and female plates.

Said female plate also incorporates means to prevent lateral movement between said male and female plates, wherein means to prevent lateral movement consists of tabs, and a hole distal to the tabs, wherein said tabs protrude from surface or edges of said female plate and engage with said male plate; the hole distal to the tabs engages with a protrusion in the male plate.

The mechanism recited has a means to attach to a parachute canopy and also a means to attach to a parachute harness. When used to link a parachute and parachute harness, two of the mechanisms recited can be used together and the means for release can be combined, whereby a single pull releases both sets of harness or webbing.

A secondary means for release, on each apparatus, are combined whereby a single pull on the secondary means releases both sets of harness or webbing.

The mechanism then, detachably connects a parachutist to a parachute, and is comprised of a) a female plate with a pocket forming part of a fulcrum; b) a male plate with a lip forming part of a fulcrum; c) said male plate having a protrusion on the end distal to the lip; d) said male plate protrusion having a hole or other means to accept a locking pin or other locking method; e) said locking pin having a primary cord, which when pulled causes release of said pin; f) said locking pin having a secondary cord or other means to cause release of said pin should said primary cord fail to cause release; g) said male plate having holes to accept a strap or straps of a parachute; h) said female plate having tabs along its sides designed to prevent lateral movement of said female plate; i) said female plate having scallops or indentations to provide clearance from straps attached to said male plate; j) said female plate having holes to accept a strap or straps of a parachute harness; k) said female plate having a hole designed to accept protrusion of said male plate.

DETAILED DESCRIPTION OF THE INVENTION

Figure 1:
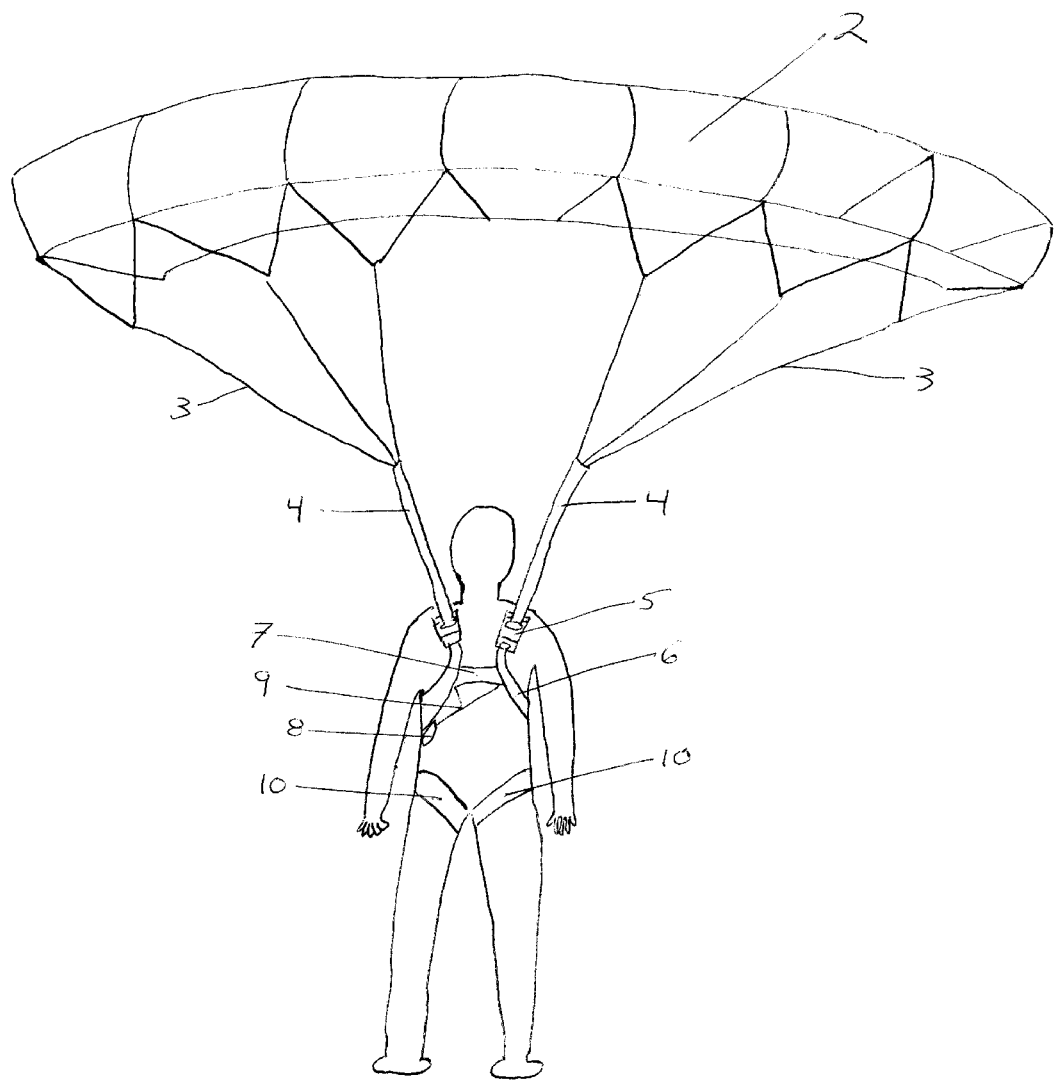
FIG. 1 is a front view of a parachutist with the main canopy deployed, showing the canopy, canopy lines, canopy risers, canopy quick release device, pull handle, bifurcated cord, chest strap, parachute harness webbing, and parachutist.

As required, detailed embodiments of the present invention are disclosed here. However, it is understood that the disclosed embodiments are merely exemplary of the invention, which may be embodied in various forms. Therefore, specific structural and functional details disclosed are not to be interpreted as limiting, but merely as a basis for the claims and as a representative basis for teaching one skilled in the art to variously employ the present invention in virtually any appropriately detailed structure.

This invention includes a male plate and female base and relates to attachment methods of parachute canopies and harness to people and objects. The invention provides a method to quickly detach two objects that are linked together with the invention, and while the example of parachute canopies and related harnesses is used, the invention has other uses as well. For example, people using rappelling gear can use the invention in order to provide a quick release from such gear. As another example, the invention can be used to secure and release the ends of a restraining wire or wires.

The means of construction of the device depends on the application and forces placed on it in that application. In critical applications such as parachuting, the device is preferably constructed of a metal such as steel, aluminum, or titanium and is forged. In less critical applications such as fastening the ends of a packing wire together, the device may be stamped steel or molded plastic.

The device includes a female half with integrated guides, fulcrum, and holes, and a male half with corresponding mating parts. In the example of a parachutist, the female half is attached to the parachute's webbing; the male half to the canopy risers. In use, the female half stays attached to the parachutist or package, while the male half separates from it and remains attached to the canopy risers.

The top of the female half uses a fulcrum, tabs and holes to align the male half. The female half may have indentations or scallops to provide room for the canopy risers looped through the male half. The bottom of the female half is designed to accept, and hold in place, the corresponding male portion.

The male half consists of a plate with attachment points for the canopy risers. The male half has a tongue at its top, which engages the female fulcrum when the two halves are coupled. The male half also has a portion designed to provide interlocking engagement with the female half. This portion, which may be in the form of a protrusion or finger, is held in place by a pin or other mechanical means. When the pin is removed, the male portion disengages from the female portion, and the canopy is released from the parachutist or package. The pin is typically removed by pulling on a bifurcated cord or wire connected to the pin. Should the bifurcated cord become separated from the pin, a secondary means of pulling the pin is provided for.

The fulcrum is formed by a lip or pocket on the female half and a lip on the male half fitting into the lip or pocket on the female half.

The male and female pieces may be flat, curved or hinged to provide better fit to the user or package.

While the drawings include the exemplary embodiments, the drawings are merely meant to be representative of the invention and not absolute with regard to particular profiles, angles, curves, and sizes.

Referring to FIG. 1 there is a parachutist 1, suspended under a canopy 2. Canopy lines 3 come to a confluence at risers 4. The risers 4 are linked through assembled canopy quick release device 5 to the parachute harness webbing 6. Chest strap 7 links parachute harness webbing 6 to prevent parachutist 1 from falling out of parachute harness webbing 6 when canopy 2 inflates. Leg straps 10 support lower body of parachutist 1 during canopy 2 inflation. Pull ring 8 is used to activate canopy quick release device 5, and is linked to canopy quick release device 5 through bifurcated cord 9.

Figure 2:
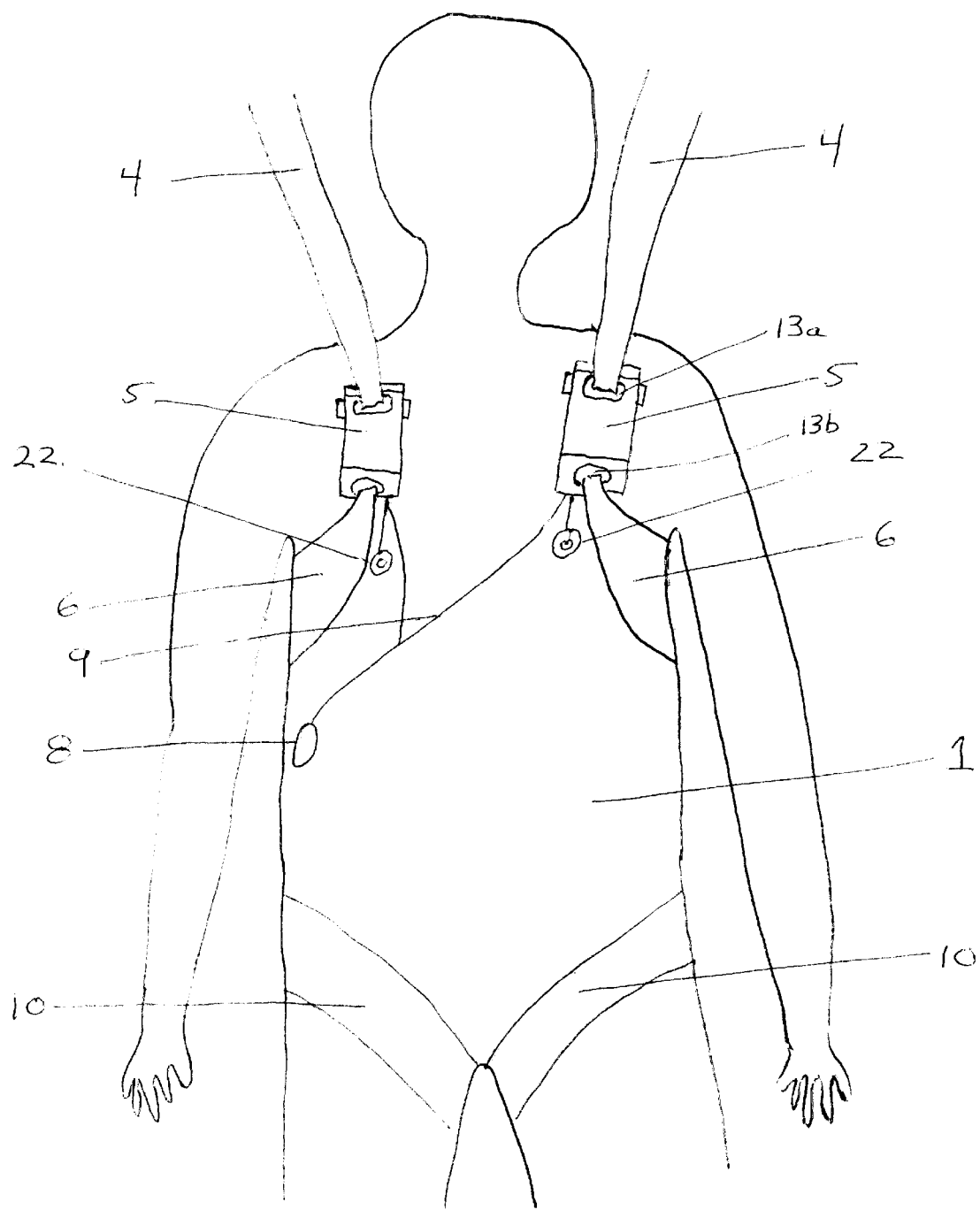
FIG. 2 is an enlarged, detailed view of a parachutist with the main canopy deployed, showing the canopy risers, canopy quick release device, pull handle, bifurcated cord, secondary activation means, parachute harness webbing, and parachutist. The chest strap has been omitted for clarity.

FIG. 2 shows an enlarged, detailed view of a parachutist 1, with chest strap 7, omitted for clarity. Risers 4 are looped through upper oblong hole 13a, in assembled canopy quick release device 5. Parachute harness webbing 6 is also fed through lower oblong hole 13b of assembled canopy quick release device 5. To release main canopy 2, parachutist 1 pulls on pull ring 8. Pull ring 8 acts on assembled canopy quick release device 5 through bifurcated cord 9. Should pull ring 8 fail to activate assembled canopy quick release device 5, parachutist 1 may pull secondary activation device 22 to activate assembled canopy quick release device 5.

Figure 3:
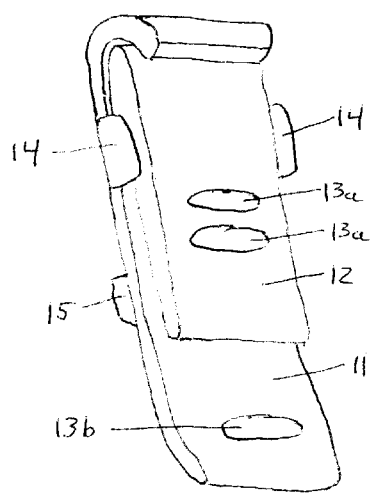
FIG. 3 is a perspective view of the canopy quick release device of the present invention comprising a female base having a fulcrum, side tabs, oblong hole for parachute harness webbing, and a male removable plate with multiple oblong holes for canopy risers.

FIG. 3 shows an assembled canopy quick release device 5 with tabs 14 protruding from the female base 11. Upper oblong holes 13a in the female base 11 provide a means for connecting parachute harness webbing 6. The male plate 12 has protrusion 15, which passes through female base 11. Lower oblong holes 13b in male plate 12 provide connection point for canopy risers 4. Tabs 14 on female base 11 help align and hold male plate 12 in place. Profile of female base 11 may be curved or flat. Profile of male plate 12 may be curved or flat. Tabs 14 may extend from edges of female plate 11 or extend from edges of male plate 12.

Figure 4:
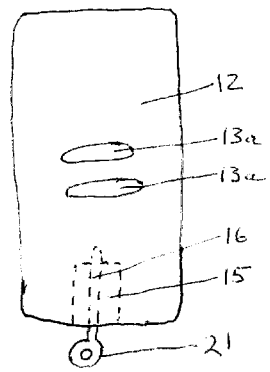
FIG. 4 is a front view of the male removable plate, showing multiple oblong holes for canopy risers, the hidden male protrusion that fits through the female plate, and the hole for the locking pin.

FIG. 4 is a frontal view of the male plate 12 showing upper oblong holes 13a for canopy risers 4. Protrusion 15 contains hole 16. Locking pin 21 fits in hole 16.

Figure 5:
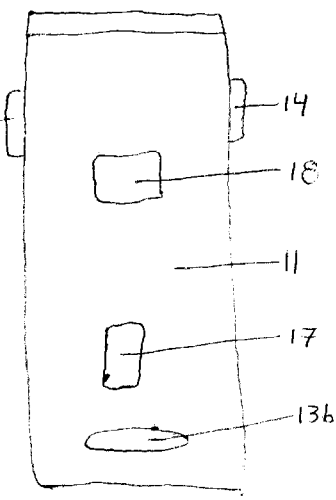
FIG. 5 is a front view of the female base, showing upper lip, multiple scallops for canopy risers, side tabs, hole for male protrusion, and oblong hole for parachute harness webbing.

FIG. 5 is a frontal view of the female base 11 showing tabs 14 and scallop 18. Scallop 18 prevents canopy risers 4 from rubbing female base 11 and becoming abraded. Hole 17 in female base 11 accepts male protrusion 15. Lower oblong hole 13b accepts parachute harness webbing 6.

Figure 6:
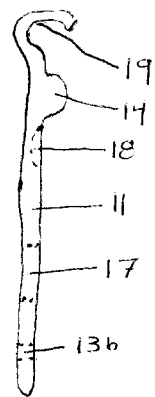
FIG. 6 is the side view of the female base showing the upper lip, side tabs, hole for male protrusion, and hole for parachute harness webbing.

FIG. 6 is a side view of female base 11, showing fulcrum pocket 19, tab 14, hole 17, and lower oblong hole 13b.

Alternative profiles of female base 11 are possible.

Figure 7:
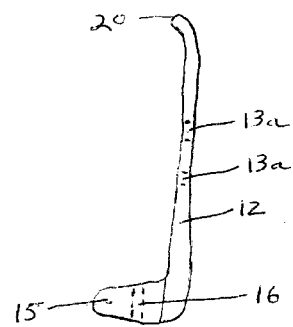
FIG. 7 is a side view of the male removable plate, showing a lip, multiple oblong holes for canopy risers, the male protrusion that fits through the female plate, and the hole for the locking pin.

FIG. 7 is a side view of male plate 12 showing fulcrum lip 20, upper oblong hole 13a, protrusion 15, and hole 16. Hole 16 is for locking pin 21. Alternative profiles of male plate 12 are possible.

Figure 8:
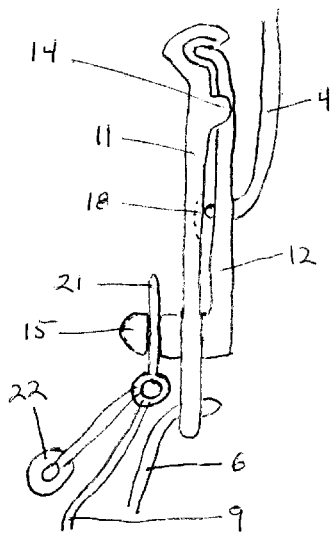
FIG. 8 is a side view of the assembled canopy quick release device showing the female base having a fulcrum, side tabs, parachute harness webbing, and a male removable plate with locking pin through protrusion, secondary activation means, and two canopy risers.

FIG. 8 is a side view of the assembled canopy quick release device 5 showing female base 11, locking pin 21, upper portion of bifurcated pull cord 9 for locking pin 21, parachute harness webbing 6, male base plate 12, and canopy riser 4. Secondary activation device 22 can be pulled to remove locking pin 21 should bifurcated cord fail.

Figure 9:
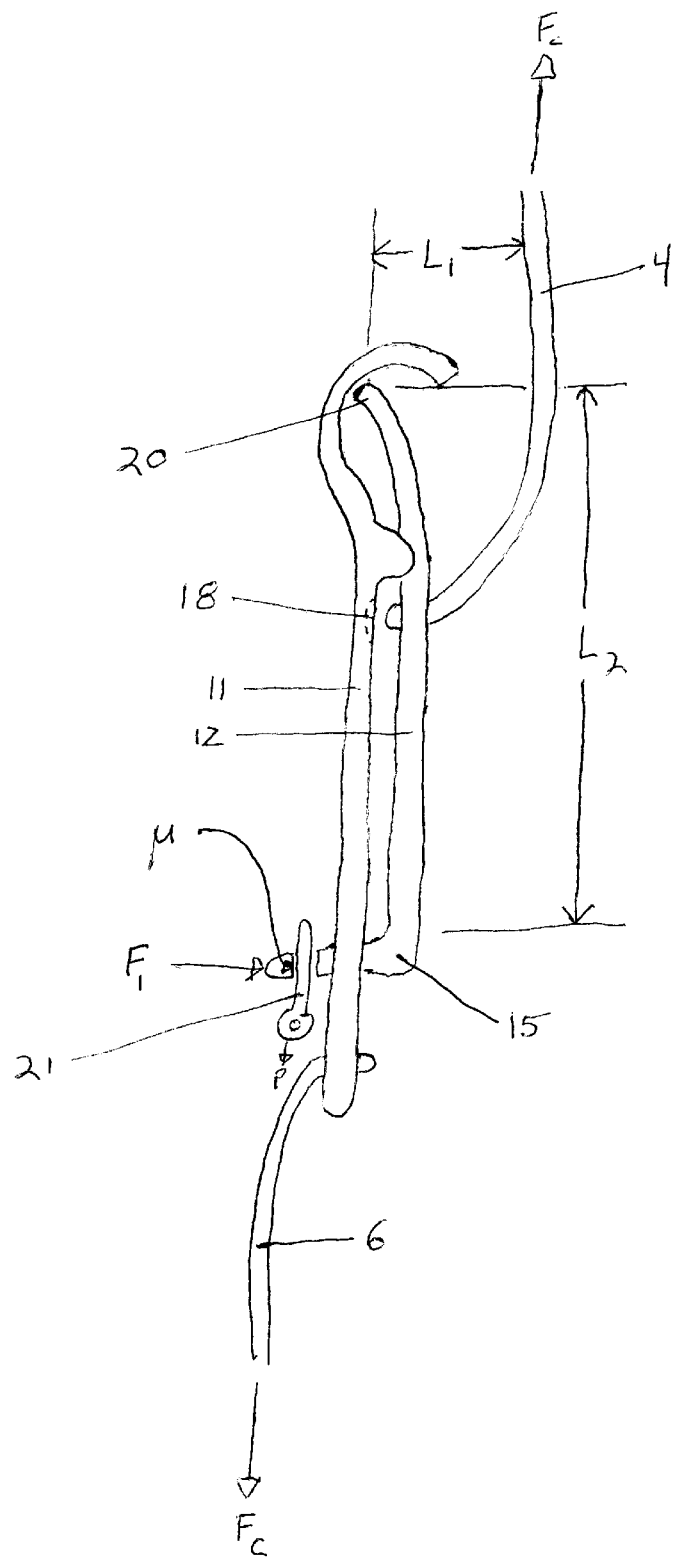
FIG. 9 is a side view of the assembled canopy quick release device showing the forces acting on the device.

FIG. 9 is a side view of the assembled canopy quick release device 5 showing the forces acting on the device. Bifurcated pull cord 9, and secondary activation device 22, have been omitted for clarity. Female base 11, male base plate 12, locking pin 21, canopy riser 4 and parachute harness webbing 6, protrusion 15, and fulcrum lip 20, are shown. $L_1$ is the distance between the fulcrum lip 20 and the canopy riser 4. $L_2$ is the distance between the fulcrum lip 20 and the top of the protrusion 15. $F_c$ is the force exerted up by the canopy 2 and also the force exerted down by the parachutist 1. P is the force required to pull the locking pin 21. The coefficient of friction $\mu$ is between the locking pin 21 and hole 16 in protrusion 15. $F_1$ is the force normal to the locking pin 21, produced by $F_c$.

When the parachutist 1 wishes to release the main canopy 2, he pulls on the pull ring 8. Pull ring 8 disengages locking pin 21 by action of bifurcated cord 9. Force $F_c$ causes male base plate 12 to pivot on fulcrum lip 20. Protrusion 15 passes through hole 17 in female base 11. Parachutist 1 now falls away from canopy 2.

The force P required to pull locking pin 21 can be calculated as follows.

$$P = \mu \times F_1. \quad \text{(Equation 1)}$$

$F_1$ is calculated by taking the summation of moments around the fulcrum lip 20, or $$F_1 \times L_2 = F_c \times L_1 = \text{summation of torque moments} = 0. \quad \text{(Equation 2)}$$

Rearranging equation 2:

$$F_1 = F_c \times (L_1/L_2) \quad \text{(Equation 3)}$$

Combining equations 3 and 1, we find;

$$P = \mu \times F_c (L_1/L_2) \quad \text{(Equation 4)}$$

Typically, $\mu = 0.1$ or less.
If $L_1/L_2 = 0.25/3 = 0.0833$ and $F_c = 500$ lbs, then P=4.166 lbs.

Figure 10:
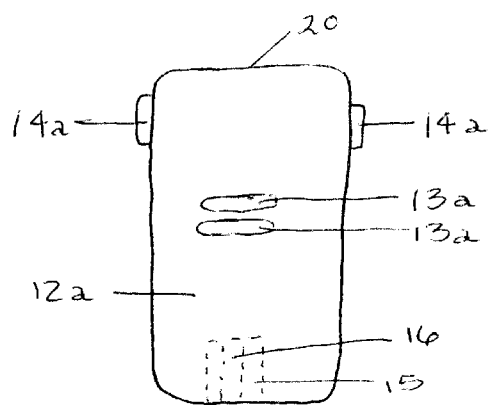
FIG. 10 is a front view of the male plate showing an alternative construction method, wherein the tabs are located on the male plate.

FIG. 10 is a front view of male plate 12a, showing an alternative method of construction. Male plate tabs 14a extend down from top surface of male plate 12a. Upper oblong hole 13a, protrusion 15, and hole 16 are shown. Fulcrum lip 20 fits fulcrum pocket 19.

Figure 11:
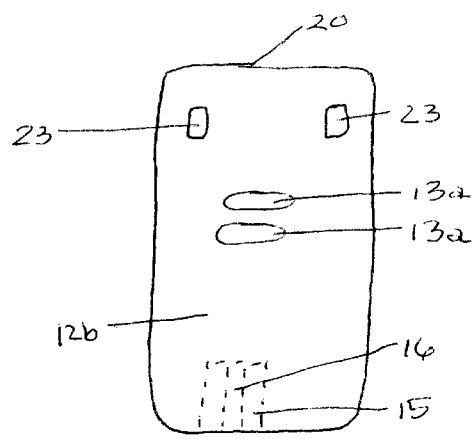
FIG. 11 is a front view of the male plate showing an alternative construction method, wherein inboard holes are provided for tabs.

FIG. 11 is a front view of male plate 12b, showing an alternative method of construction. Tab hole 23 is for protruding tab 24. Upper oblong hole 13a, protrusion 15, and hole 16 are shown. Protrusion 15 helps limit lateral movement. Hole 16 is for pin 21. Male plate 12b constructed in this fashion can be used with either female base 11 or female base 11a. Fulcrum lip 20 fits fulcrum pocket 19.

Figure 12:
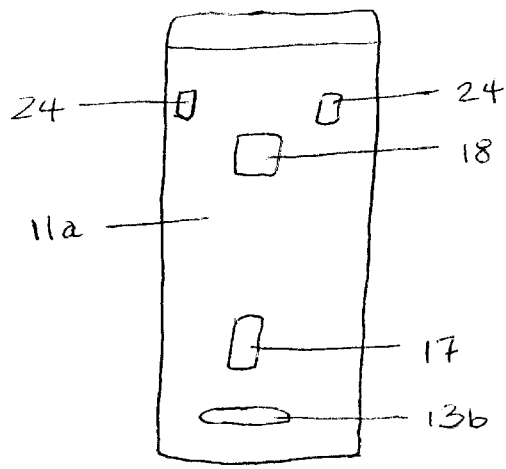
FIG. 12 is a front view of female base, showing an alternative method of construction. A protruding tab extends from surface of female base.

FIG. 12 is a front view of female base 11a, showing an alternative method of construction. Protruding tab 24 extends from surface of female base 11a. Protruding tab 24 engages tab hole 23 in male plate 12b. Scallop 18, hole 17, and lower oblong hole 13b, are shown. Hole 17 engages protrusion 15 in male base 12b.

Figure 13:
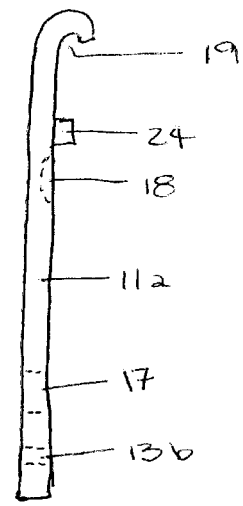
FIG. 13 is a side view of female base, shown an alternative method of construction and alternative profile.

FIG. 13 is a side view of female base 11, shown an alternative method of construction and alternative profile. Protruding tab 24 extends from surface of female base 11. Fulcrum pocket 19 engages fulcrum lip 20. Scallop 18, hole 17, and lower oblong hole 13b, are shown.

What is claimed is:

1. A secure and release mechanism that detachably connects two objects together, comprising:
   a. a male plate with means to attach said plate to a first object;
   b. a female plate with means to attach to a second object, wherein said female plate having means for accepting said male plate;
   c. a fulcrum defined by said male and female plate;
   d. means for securing said male and female plates to one another comprising a protrusion of the male plate projecting through the means for accepting the male plate, wherein a force applied to the plates by the attached objects applies a force to the means for securing by cooperation of the plates and the fulcrum, said force applied to the plates pulls plates apart, and said means for securing limits separation of said plates, and
   e. means for releasing said male and female plates from one another by operating the means for securing said male and female plates.

2. The mechanism recited in claim 1 further comprising a means to limit lateral movement between said male and female plates.

3. The mechanism recited in claim 2 wherein the means to limit lateral movement comprises rigid tabs protruding from a surface or edges of said female plate and engaging with said male plate.

4. The mechanism recited in claim 3 wherein the male plate protrusion engages with a hole in the female plate.

5. The mechanism recited in claim 1 wherein one of the first and second objects is a parachute canopy.

6. The mechanism recited in claim 1 wherein one of the first and second objects is a parachute harness.

7. A secure and release mechanism that detachably connects two objects together, comprising:
   a. a male plate with means to attach said plate to a first object;
   b. a female plate with means to attach to a second object, wherein said female plate having means for accepting said male plate;
   c. a fulcrum defined by said male and female plate;
   d. means for securing said male and female plates to one another, wherein a force applied to the plates by the attached objects applies a force to the means for securing by cooperation of the plates and the fulcrum, said force applied to the plates pulls plates apart, and said means for securing limits separation of said plates, and
   e. means for releasing said male and female plates from one another by operating the means for securing said male and female plates further comprising a second secure and release mechanism, wherein the second secure and release mechanism comprises
      a. a second male plate with means to attach said plate to attach to a first object;
      b. a second female plate with means to attach to a second object, said second female plate having means for accepting said second male plate;
      c. a fulcrum defined by said second male and second female plate;

d. means for securing said second male and second female plates to one another, wherein a force applied to the plates by the attached objects applies a force to the means for securing by cooperation of the plats and the fulcrum, said force applied to the plates pulls plates apart, and said means for securing limits separation of said plates, and e. means for releasing said second male and second female plates from one another by operating the means for securing said second male and second female plates.

8. The mechanism of claim 7 wherein the means for releasing on each mechanism are combined whereby a single pull releases both sets of plates.

9. The mechanism of claim 7 wherein a secondary means for release on each apparatus is combined whereby a single pull on the secondary means releases both sets plates.

10. A mechanism for detachably connecting a parachutist to a parachute, comprising:

a. a female plate with a pocket forming part of a fulcrum;

b. a male plate with a lip forming part of the fulcrum;

c. said male plate having a protrusion on an end distal to the lip;

d. said male plate protrusion having a hole;

e. said female plate having a hole to accept the protrusion of said male plate;

f. a locking pin in the hole of the male plate protrusion, said locking pin preventing release of the male plate from the female plate;

g. a primary cord attached to the pin which when puled causes release of said-pin;

h. said locking pin having a secondary cord to cause release of said pin should said primary cord fail to cause release:

i. said male plate having holes to accept a strap of a parachute:

j. said female plate having tabs along its sides designed to limit lateral movement of said female plate:

k. said female plate having a scallop or indentation to provide clearance for straps attached to said male plate; and l. said female plate having holes to accept a strap of a parachute harness.

11. A secure and release mechanism that detachably connects two objects together, comprising:

a. a male plate with means to attach said plate to a first object, the male plate defining a major plane, wherein the means to attach to the first object is disposed in the plane;

b. a female plate with means to attach to a second object, wherein said female plate having means for accepting said male plate;

c. a fulcrum defined by said male and female plate;

d. means for securing said male and female plates to one another, wherein a force applied to the plates by the attached objects applies a force to the means for securing by cooperation of the plates and the fulcrum, said force applied to the plates pulls plates apart, and said means for securing limits separation of said plates, and e. means for releasing said male and female plates from one another by operating the means for securing said male and female plates.

12. The mechanism recited in claim 11 wherein the means to attach said plate to a first object is disposed in a central part of the male plate.

13. The mechanism recited in claim 11 wherein the means to attach said plate to a first object comprises a pair of holes.

14. The mechanism recited in claim 1 wherein the male plate protrusion includes a hole and the means for securing includes a pin insertable through the hole.

15. The mechanism recited in claim 14 wherein, when the pin is disposed through the hole to secure plates to one another, the pin is disposed on a side of the female plate opposite a side of the plate on which the male plate means to attach is disposed.

16. The mechanism recited in claim 1 wherein, when the protrusion is disposed through the female plate, the means for securing is disposed on a side of the female plate opposite a side of the plate on which the male plate means to attach is disposed.

* * * * *

UNITED STATES PATENT AND TRADEMARK OFFICE
CERTIFICATE OF CORRECTION

PATENT NO. : 6,644,597 B1 Page 1 of 1
DATED : November 11, 2003
INVENTOR(S) : Douglas E. Bahniuk It is certified that error appears in the above-identified patent and that said Letters Patent is hereby corrected as shown below:

Column 2,
Line 24, please delete "of a)", and insert therefor -- of: a) --.

Column 8,
Line 4, please delete "holes", and insert therefor -- hole --.

Signed and Sealed this

Twenty-fifth Day of May, 2004

JON W. DUDAS
*Acting Director of the United States Patent and Trademark Office*